United States Patent
Lynch et al.

(10) Patent No.: US 7,148,600 B1
(45) Date of Patent: Dec. 12, 2006

(54) ELECTRICAL CURRENT TRANSFERRING AND BRUSH PRESSURE EXERTING INTERLOCKING SLIP RING ASSEMBLY

(75) Inventors: William A. Lynch, Philadelphia, PA (US); Wayne Marks, Jr., Suldersville, MD (US); Neal A. Sondergaard, Severna Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 147 days.

(21) Appl. No.: 10/863,844

(22) Filed: Jun. 3, 2004

Related U.S. Application Data

(60) Provisional application No. 60/545,893, filed on Feb. 20, 2004.

(51) Int. Cl.
*H02K 31/00* (2006.01)
(52) U.S. Cl. ................ 310/178; 310/249; 310/239
(58) Field of Classification Search ............... 310/177, 310/178, 248, 249, 251, 239, 244–247
See application file for complete search history.

(56) References Cited

U.S. PATENT DOCUMENTS

| | | | | |
|---|---|---|---|---|
| 920,626 | A | * | 5/1909 | Noeggerath ............... 310/178 |
| 2,247,645 | A | * | 7/1941 | Suydam ..................... 310/83 |
| 3,041,118 | A | * | 6/1962 | Campbell .................. 310/244 |
| 3,526,797 | A | * | 9/1970 | Jueschke ................... 310/245 |
| 3,584,248 | A | * | 6/1971 | Higashino et al. ........ 310/68 R |
| 4,297,605 | A | * | 10/1981 | Tak ........................... 310/242 |
| 4,340,832 | A | * | 7/1982 | Cheetham et al. ......... 310/239 |
| 4,459,504 | A | * | 7/1984 | Weldon et al. ............ 310/243 |
| 5,530,309 | A | * | 6/1996 | Weldon ..................... 310/178 |
| 6,628,036 | B1 | | 9/2003 | Lynch et al. |

OTHER PUBLICATIONS

Elger W., "Developoment of Metal Fiber Electrical Brushes for 500 kW SSMG Sets", presented by ASNE 2004 Electric Machines Tech. Symposium.
W. Elger et al. Power Point Presentation of "Development of Metal Fiber Electrical Brushs for 500 kW SSMG Sets"(2003) Presented at ASNE 2004 Electic Machines Technology Symp.
Peterson, L.J., et al. "A Study of the Magnetic Field Effects Upon Metal Fiber Current Collectors in a High Critical Temperature Superconducting Homopolar Motor"Third Naval Symposium on Electric Machines, Philadelphia PA, Dec. 2003.
D. Kuhlmann-Wilsdorf, et al "Materials Research for Sliding Electrical Contacts", Second Naval Symposium on Electical Machines, Annapolis, MD Oct. 1998.
U.S. Appl. No. 60/545,893, filed Feb. 20, 2003 entitled "Electrical Current Transferring and Brush Pressure Exerting Interlocking Slip Ring Assembly".

* cited by examiner

*Primary Examiner*—Dang Le
(74) *Attorney, Agent, or Firm*—Jacob Shuster

(57) ABSTRACT

An annular stator holder within a homopolar motor housing is positioned within magnetic fields established by magnet coils positioned in surrounding relation to brushes in sliding contact with the motor rotor. Also enclosed within the stator holder is a slip ring preassembled with the brushes attached thereto on one side by soft-solder joints with the other side attached by hard-solder joints to spring devices for clamping to the stator holder by leaf springs to exert pressure on the brushes thereby maintained in sliding contact with the rotor.

10 Claims, 3 Drawing Sheets

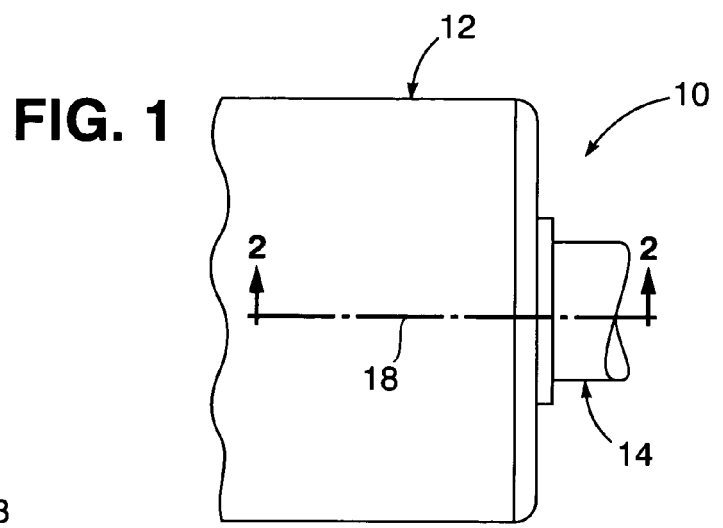
FIG. 1
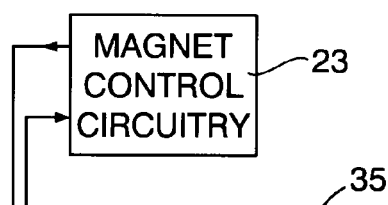
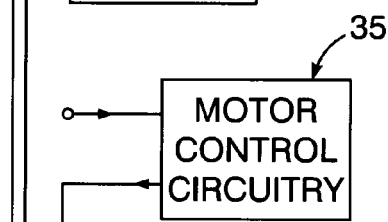
FIG. 2
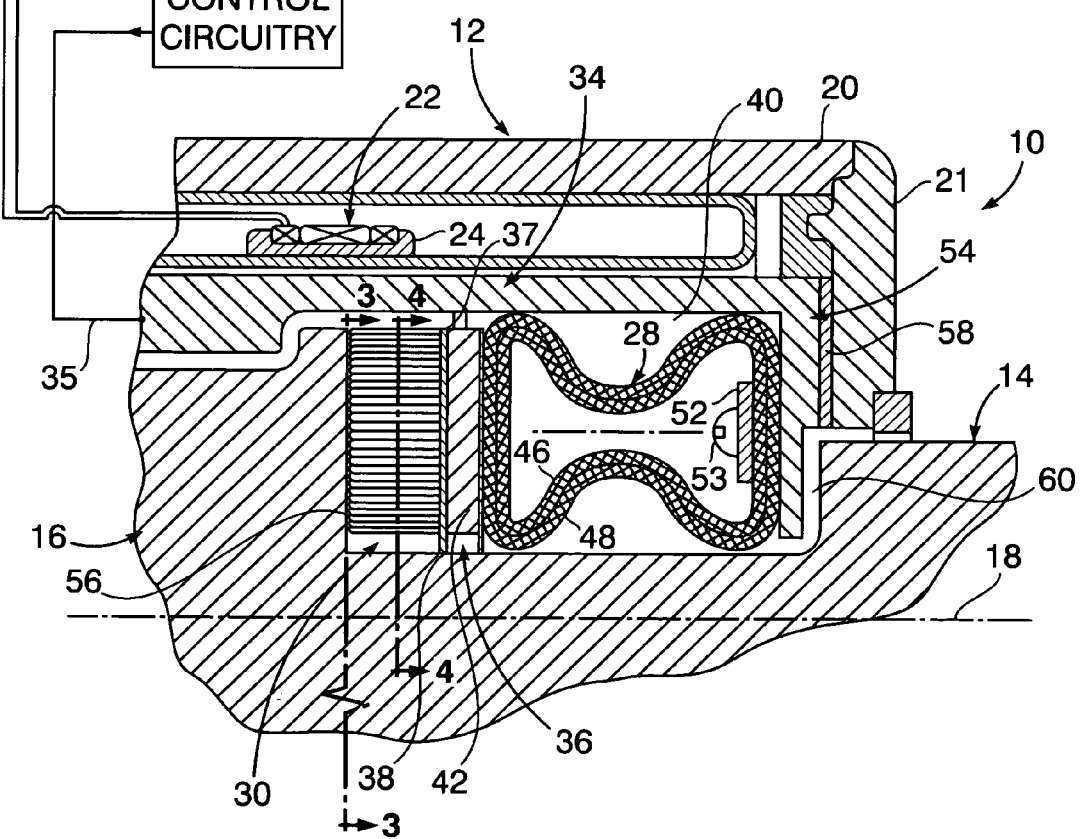

ELECTRICAL CURRENT TRANSFERRING AND BRUSH PRESSURE EXERTING INTERLOCKING SLIP RING ASSEMBLY

CROSS-REFERENCE TO RELATED APPLICATION

This application claims the benefit of U.S. Provisional Application No. 60/545,893 filed Feb. 20, 2004, entitled "ELECTRICAL CURRENT TRANSFERRING AND BRUSH PRESSURE EXERTING INTERLOCKING SLIP RING ASSEMBLY", incorporated herein by reference.

The present invention relates generally to the transfer of electrical current between spaced surfaces of machines through which electrical power is converted into mechanical output power.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The provision of a ring interlocking assembly within electrical to mechanical power conversion machines, such as motors for positioning of brush and conductive spring devices is disclosed for example in U.S. Pat. No. 6,628,036 B1 to Lynch et al. It is an important object of the present invention to facilitate disassembly and reduce energy consumption during power transfer between the spring devices and the brushes of such motors.

SUMMARY OF THE INVENTION

In accordance with the present invention, electrical power is transmitted through a plurality of conductive spring devices of a motor attached by hard solder joints to individual ring sections of a slip ring assembly. The ring sections are held attached to each other by overlapping attachment links through which the slip ring assembly may be clamped to a base holder associated with a stator housing of the motor within which magnetic fields are established. Brushes attached by soft solder joints to the ring sections are thereby held in sliding contact with a surface of a rotor to which a mechanical output shaft of the motor is connected. Upon assembly the spring devices are clamped to the base holder to thereby hold the brushes under pressure in sliding surface contact with the rotor.

DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 1 is a partial side elevation view of a drive motor with which the present invention is associated;

FIG. 2 is an enlarged partial section view taken substantially through a plane indicated by section line 2—2 in FIG. 1;

DETAILED DESCRIPTION OF PREFERRED EMBODIMENT

Figure 3:
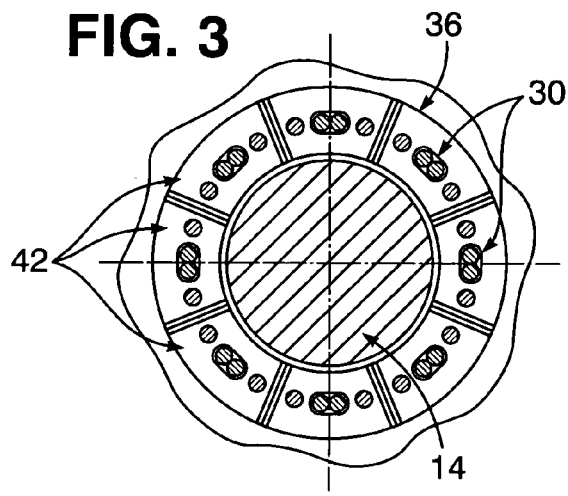
FIG. 3 is a transverse section view taken substantially through a plane indicated by section lines 3—3 in FIG. 2.
Figure 4:
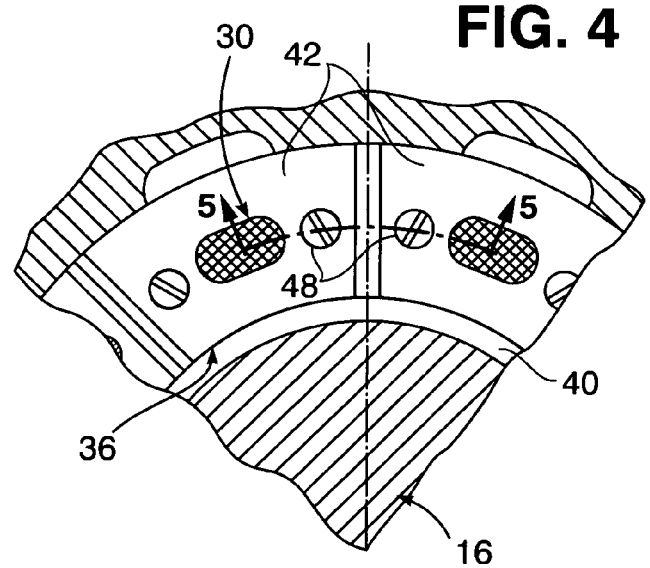
FIG. 4 is a partial section view taken substantially through a plane indicated by section line 4—4 in FIG. 2.

Referring now to the drawing in detail, FIG. 1 illustrates an electric super-conducting homopolar type of drive motor 10, having a stator housing 12 from which an output shaft 14 extends. Such motor 10 is referred to for example in U.S. Pat. No. 6,628,036 B1 to Lynch et al. As shown in FIG. 2, the output shaft 14 of the motor 10 is connected to a rotor 16 for rotation therewith about an axis 18. As generally known in the art the housing 12 of the homopolar motor 10 has a radially outer annular flux shield section 20 and axial end walls 21 enclosing annular magnet coil assemblies 22 positioned therein to which DC power is supplied from magnet control circuitry 23 as diagrammed in FIG. 2 so as to establish magnetic fields for imparting rotation to the rotor 16. The magnet coil assemblies 22 are fixedly supported within the housing 12 on axially spaced annular stator bases 24 in surrounding relation to metal fiber brushes 30. Spring devices 28 of serpentine shape as disclosed in the aforementioned Lynch et al patent, have axial ends that are gold-plated and positioned within an annular holder 34. As also diagrammed in FIG. 2, an electric wire connection 35 extends from the holder 34 to motor control circuitry 35 as generally known in the art.

Figure 5:
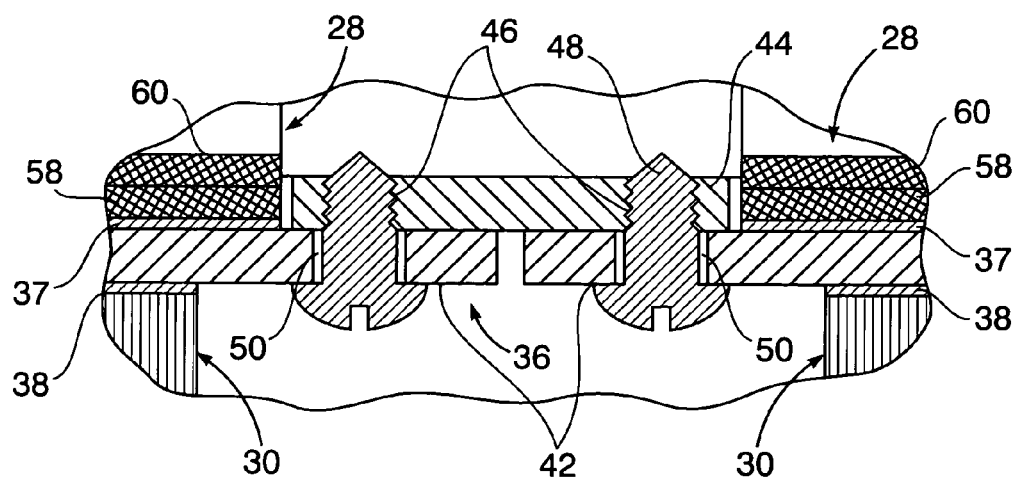
FIG. 5 is a partial section view taken substantially through a plane indicated by section line 5—5 in FIG. 4.

Pursuant to the present invention, each of the spring devices 28 at one axial end thereof as shown in FIGS. 2 and 5 is provided with a hard-solder joint 37 for attachment thereof to an annular electrically conductive interlocking ring assembly 36. Each of the brushes 30 is attached to one side of the interlocking ring assembly 36 opposite the spring device 28 by soft-solder joints 38. The spring devices 28 and the brushes 30 are shown attached to the ring assembly 36 in FIG. 6. After the ring assembly 36 is assembled with the spring devices 28 and the brushes 30 soldered thereto, it is positioned inside the housing 12 within an annular cavity 40 enclosed by the holder 34 about the rotor 16 as shown in FIG. 2.

Figure 6:
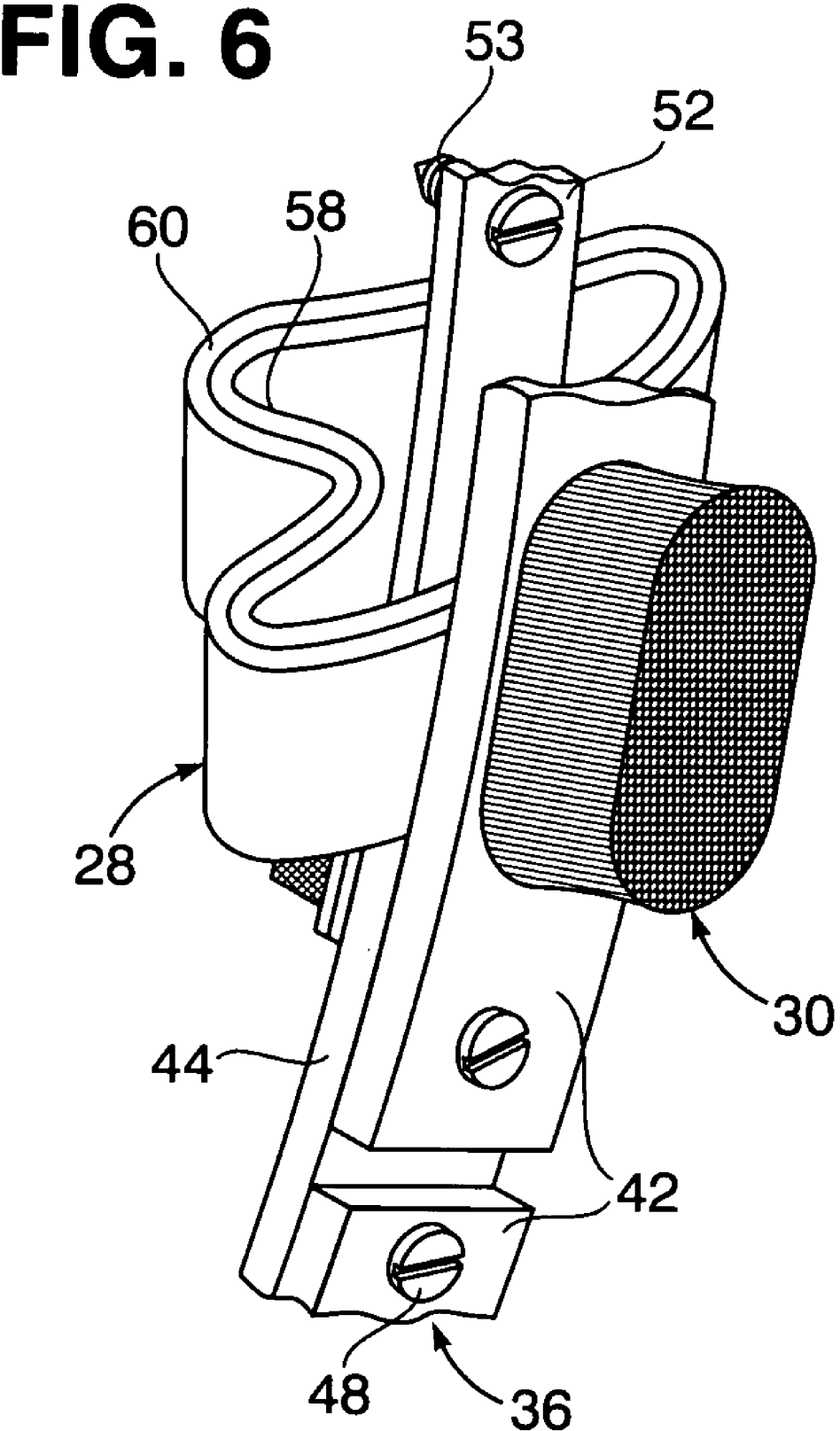
FIG. 6 is a partial perspective view corresponding to the arrangement illustrated in FIGS. 2–5.

As shown in FIGS. 2–6, the brush interlocking ring assembly 36 is formed by a plurality (such as eight) of ring sections 42 interconnected by shorter overlapping attachment links 44. Each of the links 44 as shown in FIG. 5 is provided with a pair of threaded holes 46 threadedly receiving screws 48 having their slotted heads exposed on the same side of the ring assembly 36 with the brushes 30 which are positioned on the ring sections 42 and attached thereto by the solder joints 38. The ring sections 42 are held assembled with the links 44 by the screws 48 extending through holes 50 formed in the ring sections 42 in alignment with the link screw holes 46. As shown in FIGS. 2 and 6, spring attachment leaves 52 are attached by screws 53 to an axial end 54 of the annular holder 34 for holding the spring devices 28 clamped to the holder 34. The spring devices 28 thereby exert pressure on the brushes 30 to hold them in sliding contact with an annular surface 56 on the rotor 16, axially spaced from the end 54 of the holder 34. Each of the spring devices 28 as shown in FIGS. 2, 5 and 6 is formed from a pair of inner and outer braids 58 and 60. At the side of the spring device 28 attached to the brush holding ring section 42 by the solder joint 37, it is stiffened. At the other side of the spring device 28, it is held flattened under pressure in surface contact with the fixed end 54 of the base holder 34.

As shown in FIG. 2 each of the axial ends 21 of the housing 12 is spaced from the base holder end 54 by an annular insulator 58. Also, a radially inner portion of the holder end 54 is axially spaced at location 60 within the annular cavity 40 from the rotor shaft 14.

It will be apparent from the foregoing description that the ring sections 42 and the links 44 of the interlocking ring assembly 36 may be dissembled by withdrawal of the link screws 48 for separate removal of the ring sections 42 with the attachment links 44 from the motor housing 12. For assembly of the link assembly 36 with the spring devices 28 and the brushes 30, the spring devices 28 are attached by the hard solder joints 37 to one of the surfaces of each of the ring sections 42 before attachment of the brushes 30 to the opposite surfaces thereof by use of the soft-solder joints 38 with a lower melting point, in order to avoid melting of the previously applied spring solder joints 37. The ring sections 42 and the attachments links 44 may then be assembled and attached through the spring leaves 52 as shown in FIGS. 2 and 6 to the end 54 of the stator base holder 34 for installation within the motor 10, establishing low loss fixed current paths from the motor control circuitry 35 to the brush assemblies 30, with pressure being exerted by means of the spring devices 28 on the brushes 30 maintaining them in sliding contact with the rotor surface 56.

As a result of the foregoing described arrangement, the interlocking ring assembly 36 provides a stable mounting structure for the spring devices 28 and the brushes 30 in sliding contact with the rotor 16, while allowing for facilitated individual removals thereof. Although eight of the brushes 30 are shown in FIG. 3, any other number of the metal fiber brushes 30 may be accommodated pursuant to the present invention. Other types of brushes may also be accommodated, such as foil brushes, braid brushes, microfiber brushes, ring brushes, solid brushes, liquid metal brushes and liquid-fiber hybrid brushes. The assembly of the brushes 30 and the conductive spring devices 28 on the interlocking ring assembly 36 could also be used in commutating motors, other than the non-commutating slip ring type of motor 10 as hereinbefore described.

Other alternative embodiments of the present invention may be resorted to, within the scope of the appended claims.

What is claimed is:

1. In combination with an electric motor having: a rotor to which electrical current is transmitted from a stator through brushes attached to an interlocking brush ring assembly positioned within the stator through which the electrical current is conducted to the brushes in sliding contact with the rotor; said interlocking brush ring assembly comprising: a segmented annular conductor comprising a plurality of individual ring sections to which the brushes are respectively attached; attachment means for interconnecting the individual ring sections; and spring means attached to the individual ring sections for exerting pressure on the brushes to maintain said sliding contact thereof with the rotor during operation of the motor, wherein the spring means are attached to a first side of the individual ring sections of the segmented annular conductor by hard solder joints having a first melting point and the brushes are attached to a second side of the individual ring sections of the segmented annular conductor by soft solder joints having a second melting point that is lower than the first melting point of the hard solder joints.

2. The combination as defined in claim 1, wherein the stator includes a base holder on which magnetic field establishing coils are mounted in surrounding relation to the brushes.

3. The combination as defined in claim 2, wherein said spring means comprises a plurality of spring devices clamped to the base holder.

4. The combination as defined in claim 1, wherein said spring means comprises a plurality of spring devices clamped to the stator.

5. The combination as defined in claim 1, wherein said attachment means comprises: a plurality of links overlapping the individual ring sections; and screw means for threadedly connecting overlapping portions of the individual ring sections and the links.

6. The combination as defined in claim 1, wherein at least one brush is attached to each individual ring section.

7. An interlocking brush ring assembly for an electric motor comprising:
   a segmented annular conductor comprising a plurality of individual ring sections, wherein at least one brush is attached to at least one individual ring section;
   an attachment mechanism configured to interconnect a pair of adjacent individual ring sections; and
   a spring attached to at least one individual ring section configured to exert pressure on a brush associated with the individual ring section, wherein the spring is attached to a first side of the individual ring section by a hard solder joint having a first melting point and the at least one brush is attached to a second side of the individual ring section by a soft solder joint having a second melting point that is lower than the first melting point of the hard solder joint.

8. The interlocking brush assembly of claim 7, wherein the spring further comprises a spring device clamped to a base holder.

9. The interlocking brush assembly of claim 7, wherein the attachment mechanism further comprises: a link configured to overlap a portion of each of the adjacent individual ring sections; and one or more screws threadedly connecting the overlapping portions of each individual ring section and the link.

10. The combination as defined in claim 7, wherein at least one brush is attached to each individual ring section.

* * * * *